(12) United States Patent
Vigholm et al.

(10) Patent No.: US 7,845,458 B2
(45) Date of Patent: Dec. 7, 2010

(54) CONTROL SYSTEM FOR FRAME-STEERING OF A VEHICLE AND METHOD FOR CONTROLLING TWO STEERING CYLINDERS IN A FRAME-STEERED VEHICLE

(75) Inventors: Bo Vigholm, Stora Sundby (SE); Markku Palo, Ekilstuna (SE)

(73) Assignee: Volvo Construction Equipment AB, Eskilstuna (SE)

( * ) Notice: Subject to any disclaimer, the term of this patent is extended or adjusted under 35 U.S.C. 154(b) by 539 days.

(21) Appl. No.: 11/623,646

(22) Filed: Jan. 16, 2007

(65) Prior Publication Data

US 2008/0210485 A1    Sep. 4, 2008

Related U.S. Application Data

(60) Provisional application No. 60/760,016, filed on Jan. 18, 2006.

(30) Foreign Application Priority Data

Jan. 16, 2006 (SE) .................... 0600086

(51) Int. Cl.
*B62D 5/06* (2006.01)
(52) U.S. Cl. .................. 180/417; 180/441; 180/442
(58) Field of Classification Search .......... 180/417, 180/441, 442, 418
See application file for complete search history.

(56) References Cited

U.S. PATENT DOCUMENTS

| 4,410,057 | A | * | 10/1983 | Johnson | 180/406 |
| 5,335,926 | A | * | 8/1994 | Stolle | 296/117 |
| 6,684,975 | B2 | * | 2/2004 | Rudolph | 180/419 |
| 7,412,315 | B2 | * | 8/2008 | Wildey et al. | 701/41 |
| 7,434,653 | B2 | * | 10/2008 | Khalil et al. | 180/418 |

* cited by examiner

*Primary Examiner*—Joanne Silbermann
*Assistant Examiner*—Tashiana Adams
(74) *Attorney, Agent, or Firm*—Novak Druce + Quigg, LLP

(57) ABSTRACT

A control system (201) for a frame-steered vehicle that includes a first steering cylinder (104) and a second steering cylinder (105). The steering cylinders are arranged for frame-steering of the vehicle. The system includes a first drive unit (202) and a second drive unit (204), each of which has an electrical machine (206,208) and a hydraulic machine (210, 212). Each respective electrical machine is drivingly connected to its associated hydraulic machine, wherein with a first (210) of the two hydraulic machines is arranged for flow-communication with a piston side (214) of the first steering cylinder (104) and a piston rod side (216) of the second steering cylinder (105). A second (212) of the two hydraulic machines is arranged for flow-communication with a piston side (218) of the second steering cylinder and a piston rod side (220) of the first steering cylinder.

26 Claims, 7 Drawing Sheets

CONTROL SYSTEM FOR FRAME-STEERING OF A VEHICLE AND METHOD FOR CONTROLLING TWO STEERING CYLINDERS IN A FRAME-STEERED VEHICLE

CROSS-REFERENCE TO RELATED APPLICATIONS

The present application claims the benefit of U.S. Application No. 60/760,016 filed 18 Jan. 2006 and claims priority to Swedish Application No. 0600086-3 filed 16 Jan. 2006. Said applications are expressly incorporated herein by reference in their entirety.

FIELD

The present invention relates to a control system for controlling a frame-steered vehicle, which system comprises a first and a second steering cylinder, which steering cylinders are arranged for frame-steering of the vehicle. The invention also relates to a method for controlling two steering cylinders in a frame-steered vehicle.

BACKGROUND

Such a control system is found, for example, on various types of working vehicles comprising a front and a rear part of a vehicle, which parts each have a frame and at least one wheel axle. The vehicle parts are connected to each other in such a way that they can pivot and the parts can be rotated in relation to each other around said pivot point by means of said two steering cylinders.

The invention will be described below in association with a working machine in the form of a wheel loader. This is a preferred, but in no way restricting application of the invention. The invention can also be used for other types of frame-steered vehicles, such as an articulated hauler.

The steering in a working machine must be very reliable. A loader usually has an ordinary steering wheel, but can, in parallel, also be equipped with steering by means of a lever. The steering wheel is used during transportation and the lever is used during work at lower speeds such as, for example, when loading trucks, as this is more comfortable for the driver.

A conventional control system comprises a pump that is driven by the vehicle's motor and that provides the steering cylinders with pressurized hydraulic fluid from a tank. A first hydraulic valve is connected mechanically to the steering wheel and is arranged on a conduit between the pump and the steering cylinders, whereby hydraulic energy is transferred to the steering cylinders when the driver turns the steering wheel. A second hydraulic valve, normally a proportional directional valve, is connected electrically to the steering lever via a control unit and is arranged on a conduit between the pump and the steering cylinders. Hydraulic energy is thereby transferred to the steering cylinders when the driver moves the lever.

SUMMARY

A first object of the invention is to achieve a control system for steering a frame-steered working machine that makes the steering more efficient as far as energy is concerned. This is achieved with a control system that comprises a first drive unit and a second drive unit, each of which comprises an electrical machine and a hydraulic machine, wherein each respective electrical machine is drivingly connected to its associated hydraulic machine, wherein a first of the two hydraulic machines is arranged for flow communication with a piston side of the first steering cylinder and a piston rod side of the second steering cylinder, and wherein a second of the two hydraulic machines is arranged for flow communication with a piston side of the second steering cylinder and a piston rod side of the first steering cylinder.

The electrical machines are preferably electrically connected to a control unit. A steering wheel and/or a lever are electrically connected to the control unit for sending control signals. In the event of a command to steer in a certain direction, the control unit sends a control signal to the electrical machines, whereupon a first of the hydraulic machines is driven by its associated electrical machine and supplies the hydraulic cylinders with pressurized hydraulic fluid from a tank. The second hydraulic machine is driven by a flow of hydraulic fluid from the hydraulic cylinders and drives its associated electrical machine. The latter electrical machine thereby functions as a generator and can recover energy from the steering movement. The first hydraulic machine thus functions as a pump and determines the steering speed. The second hydraulic machine functions as a motor and resists with a certain torque, which is regenerated into electricity.

The speed of the steering cylinders is preferably controlled directly by the electrical machine; that is, no control valves are required between the hydraulic machine and the steering cylinders to regulate the direction and speed of the movement. In certain cases, on/off-valves are required, that open and close a communication path for the flow of hydraulic fluid.

A second object of the invention is to achieve a method for steering a frame-steered working machine that makes the steering more efficient as far as energy is concerned. This object is achieved by a method comprising the steps of driving a first hydraulic machine to supply a piston side of the first steering cylinder and a piston rod side of the second steering cylinder with pressurized hydraulic fluid, and of allowing driving of a second hydraulic machine by a flow of hydraulic fluid from a piston side of the second steering cylinder and a piston rod side of the first steering cylinder.

Additional preferred embodiments and advantages of the invention are apparent from the additional subsidiary claims and from the following description.

BRIEF DESCRIPTION OF THE DRAWINGS

The invention will be described in greater detail in the following, with reference to the embodiments that are shown in the attached drawings, in which.

DETAILED DESCRIPTION

Figure 1:
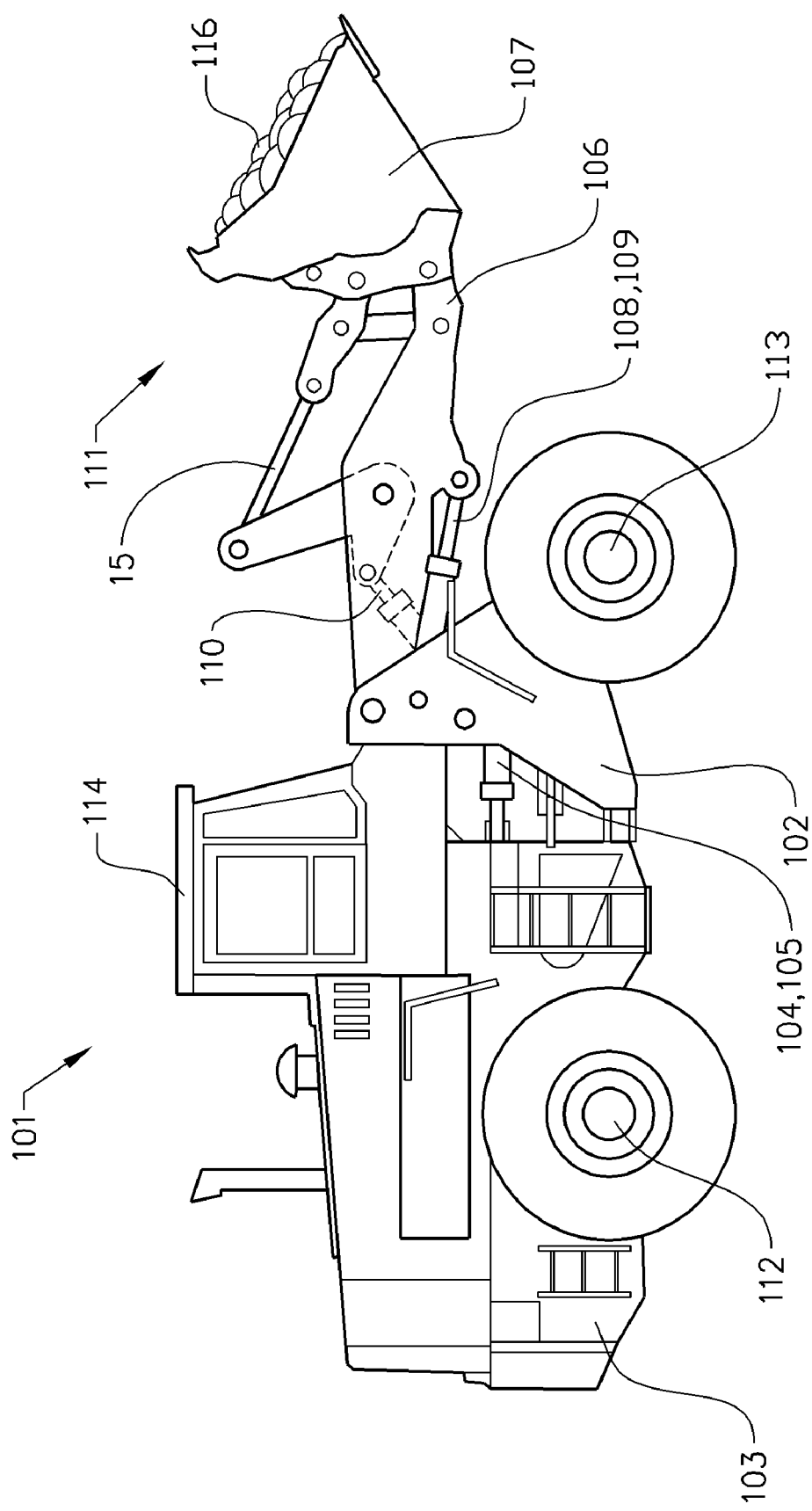
FIG. 1 is a side view of a wheel loader.

FIG. 1 shows a side view of a wheel loader 101. The wheel loader 101 comprises a front vehicle part 102 and a rear vehicle part 103, which parts each comprise a frame and a pair of axles 112, 113. The rear chassis part 103 comprises a driver's cab 114. The vehicle parts 102,103 are connected to each other in such a way that they can be pivoted in relation to each other around a vertical shaft by means of two hydraulic cylinders 104,105 that are arranged between the two parts. The hydraulic cylinders 104,105 are thus arranged on different sides of a center line in the longitudinal direction of the vehicle, for steering or turning the wheel loader 101.

The wheel loader 101 comprises equipment 111 for handling objects or material. The equipment 111 comprises a lift arm unit 106 and a device 107 in the form of a scoop that is mounted on the lift arm unit. The scoop 107 is here filled with material 116. A first end of the lift arm unit 106 is connected to the front vehicle part 102 in such a way that it can rotate, in order to achieve a lifting movement of the scoop. The device 107 is connected to a second end of the lift arm unit 106 in such a way that it can rotate, in order to achieve a tilting movement of the scoop.

The lift arm unit 106 can be raised and lowered in relation to the front part 2 of the vehicle by means of two hydraulic cylinders 108,109, each of which is connected at one end to the front vehicle part 102 and at the other end to the lift arm unit 106. The scoop 107 can be tilted in relation to the lift arm unit 106 by means of a third actuating device in the form of a hydraulic cylinder 110, which is connected at one end to the front vehicle part 102 and at the other end to the scoop 107 via a link arm system.

Figure 2:
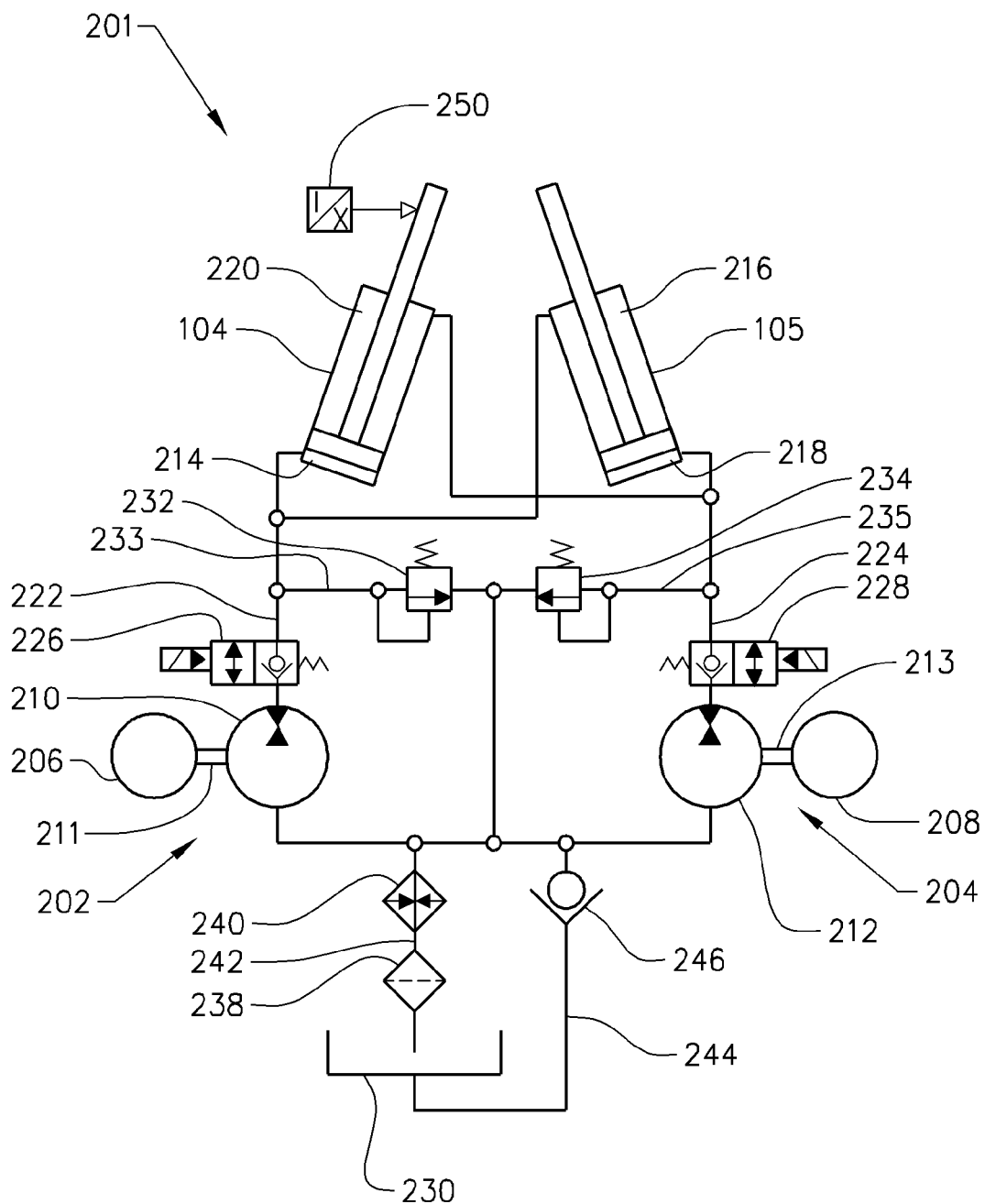
FIGS. 2-6 show different embodiments of a control system for frame-steering of the wheel loader.

FIG. 2 shows a first embodiment of a control system 201 for frame-steering of the wheel loader 101.

The control system 201 comprises said first steering cylinder 104 and second steering cylinder 105. The control system 201 comprises, in addition, a first drive unit 202 and a second drive unit 204, each of which comprises an electrical machine 206,208 and a hydraulic machine 210,212. Each electrical machine 206,208 is mechanically drivingly connected to its associated hydraulic machine 210,212 via an intermediate shaft 211,213.

A first 210 of the two hydraulic machines is arranged for flow communication with a piston side 214 of the first steering cylinder 104 and a piston rod side 216 of the second steering cylinder 105. The second 212 of the two hydraulic machines is arranged for flow communication with a piston side 218 of the second steering cylinder 105 and a piston rod side 220 of the first steering cylinder 104.

The hydraulic machine 210 of the first drive unit 202 is connected to the hydraulic cylinders 104,105 via a first conduit 222 and the hydraulic machine 212 of the second drive unit 204 is connected to the hydraulic cylinders 104,105 via a second conduit 224. A means 226,228 is arranged on both the first conduit and the second conduit 222,224 for controlling the direction of flow through the conduit. Said control means comprises an electrically-controlled valve 226,228.

For steering the wheel loader 101 in one direction (for example to the right), a first 226 of the electrically-controlled valves is opened and a first of the hydraulic machines 210 is driven by its associated electrical machine 206 and supplies the hydraulic cylinders 104,105 with pressurized hydraulic fluid from a tank 230, and the second hydraulic machine 212 is driven by a flow of hydraulic fluid from the hydraulic cylinders 104,105 and drives its associated electrical machine 208.

For steering the wheel loader 101 to the left, a second 226 of the electrically-controlled valves is opened instead and the second hydraulic machine 212 is driven by its associated electrical machine 208 and supplies the hydraulic cylinders 104,105 with pressurized hydraulic fluid from the tank 230, and the first hydraulic machine 210 is driven by a flow of hydraulic fluid from the hydraulic cylinders 104,105 and drives its associated electrical machine 206.

The hydraulic machines 210,212 are thus driven at the same time in opposite directions when the wheel loader 101 is being steered.

The hydraulic machine that functions as a pump thus determines the steering speed. Thus no control valves are required between the hydraulic machine and the steering cylinders 104,105 for said steering.

The hydraulic machine that functions as a motor is driven by the flow and resists with a certain torque, which is regenerated into electricity. The size of the counteracting torque can be increased or reduced as a function of the steering speed and/or machine speed. The counter-torque can also be changed as required. Jerky steering can be detected via the derivative of the rotation speed of the hydraulic machines. For down ramping, it may be necessary to increase the counter-torque to a higher level.

A first pressure-restricting valve 232 is arranged on a conduit 233 that connects the first conduit 222 to the tank 230. A second pressure-restricting valve 234 is arranged on a conduit 235 that connects the second conduit 224 to the tank 230.

A filtration unit 238 and a heat exchanger 240 are arranged on the conduit 242 that connects the hydraulic machines 210,212 to the tank 230. A filtration flow and a heating flow are obtained by means of the flow difference that arises between the hydraulic machines 210,212, which is caused by geometric differences in the cylinder movements. The heat exchanger 240 is arranged to transfer heat from cooling water from the vehicle's propulsion motor (suitably a diesel engine) to the system's hydraulic fluid. Heating up of the hydraulic fluid can thereby be achieved when required.

In addition, the hydraulic machines 210,212 are connected to the tank 230 via a first suction conduit 244. A means 246, in the form of a non-return valve, is arranged to permit suction of hydraulic fluid from the tank 230 and to prevent a flow of hydraulic fluid to the tank through the suction conduit 244.

A sensor 250 is arranged to detect the relative positions of the vehicle parts 102,103. The sensor 250 consists of a position detector that is arranged to detect the position of the piston rod in one of the steering cylinders 104. The sensor 250 detects the position of the piston rod repeatedly, essentially continually, and produces corresponding signals.

Immediately after a steering movement has been carried out and with a certain frequency and/or if the position detector 250 indicates an inactivated steering movement, pressurizing is carried out via the hydraulic machines 210,212. The position detector 250 can be utilized for registering that no unintentional steering arises in the event of pressurizing in situations such as when the machine is on an upward slope (suspended load) or when cavitation has arisen after a shock.

Figure 3:
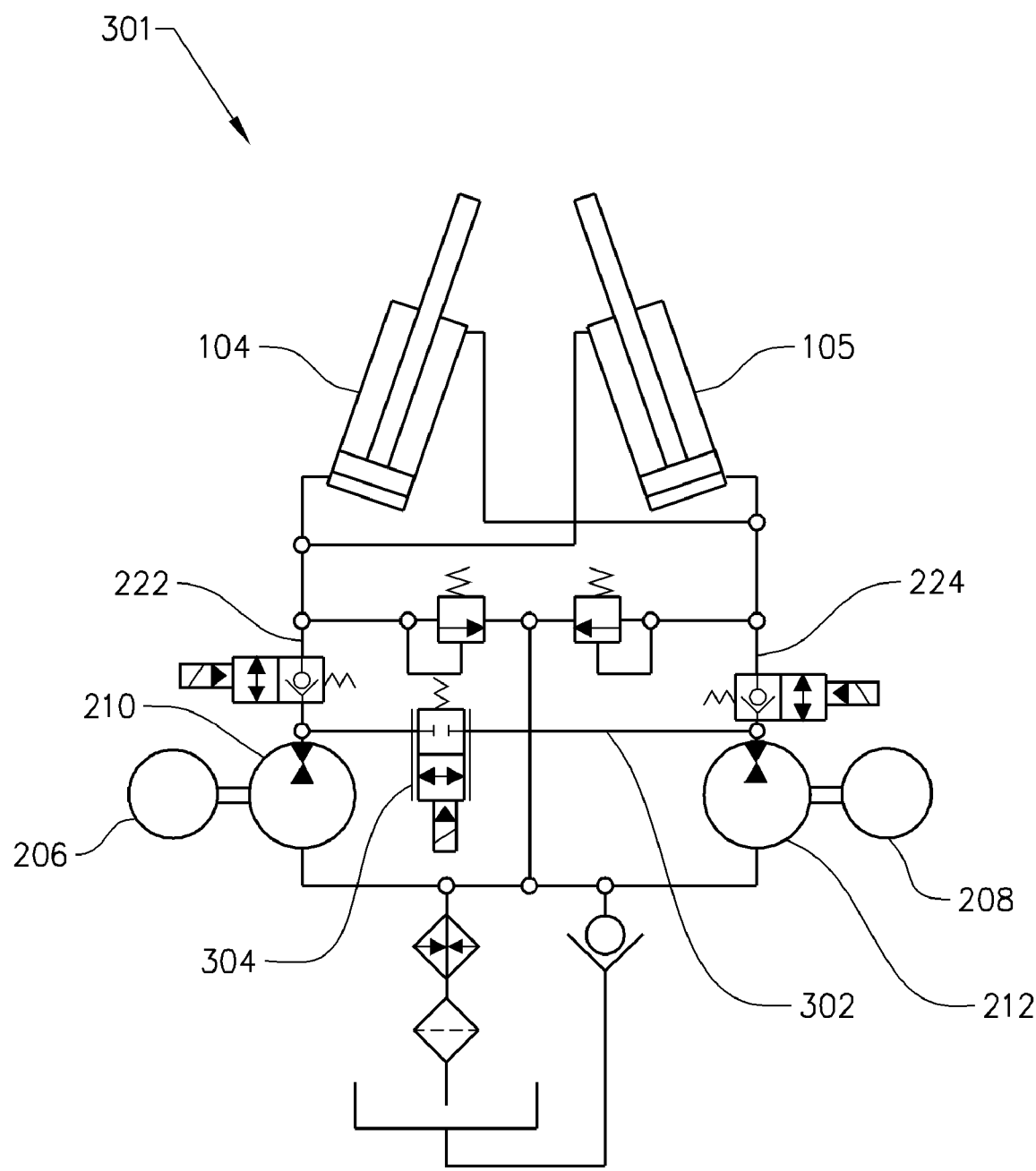

FIG. 3 shows a second embodiment of a control system 301 for frame-steering of the wheel loader 101. The two hydraulic machines 210,212 are connected to each other via a conduit 302 in parallel with the hydraulic cylinders. More specifically, the parallel conduit 302 connects the first conduit and the second conduit 222,224 between the hydraulic machines 210,212 and the hydraulic cylinders 104,105.

A means 304 is arranged on the parallel conduit 302 for achieving a leakage flow between the hydraulic machines 210,212 at the commencement of a steering movement. The leakage flow means consists here of an electrically controlled leakage-flow valve 304. By this means, better regulation can be achieved at the commencement of movements.

At the commencement of the steering, the leakage flow valve 304 is opened, so that the hydraulic machines 210,212 attain a certain initial rotational speed before the steering is carried out. This is in order to overcome initial friction. The leakage flow valve 304 can then be closed as the steering speed increases. The leakage flow valve 304 is a small valve that only creates sufficient leakage flow to enable the hydraulic machines to start before the cylinder movement commences. As an alternative to the valve 304, a permanent regulator can be used, so that a leakage flow is obtained the whole time. However, a regulator results in certain energy losses.

Figure 4:
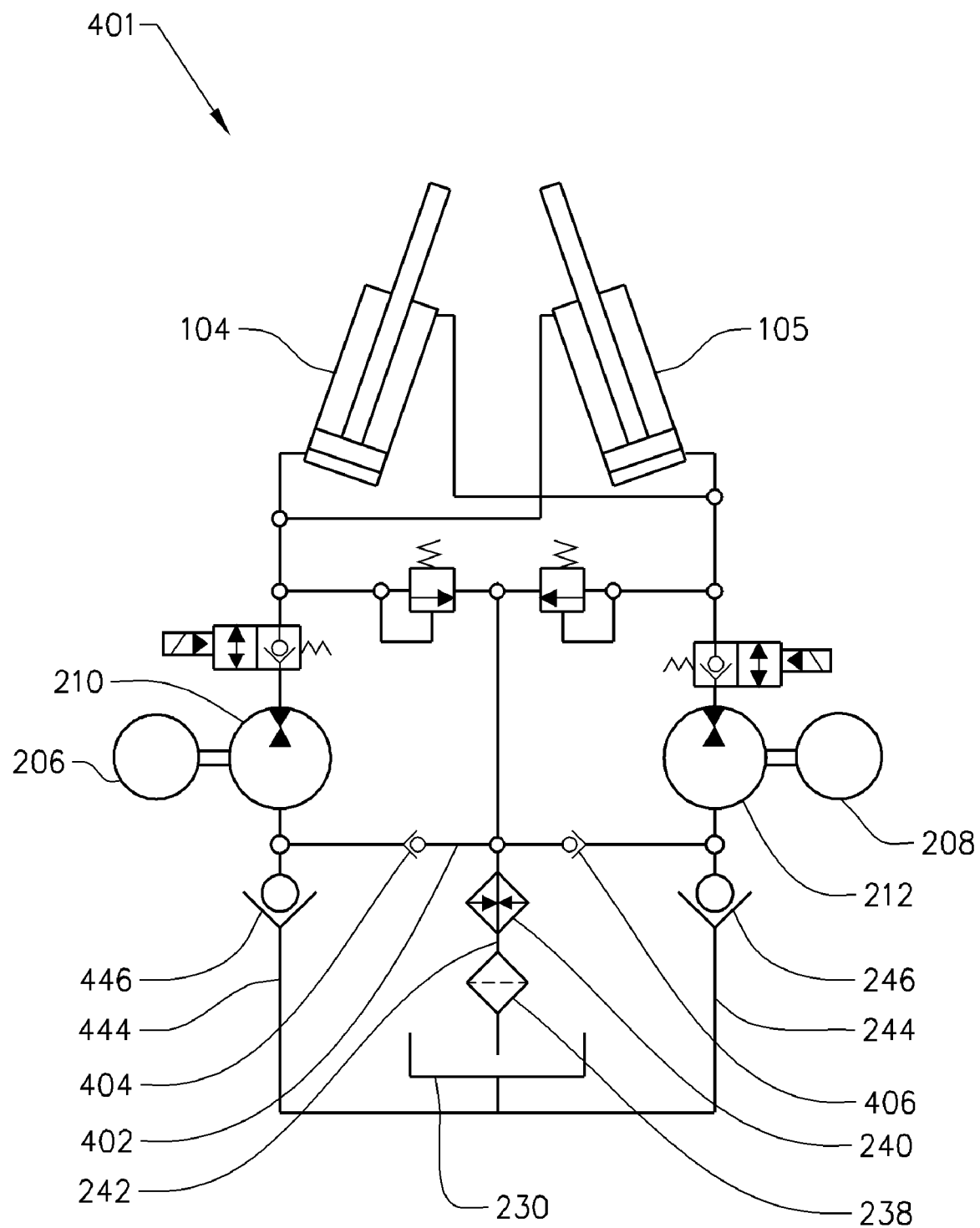

FIG. 4 shows a third embodiment of a control system 401 for frame-steering of the wheel loader 101.

In addition, the hydraulic machines 210,212 are connected to the tank 230 via a second suction conduit 444. A means 446, in the form of a non-return valve, is arranged to allow suction of hydraulic fluid from the tank 230 and to prevent a flow of hydraulic fluid to the tank through the suction conduit 444. The second suction conduit 444 is arranged in parallel with the first suction conduit 244.

A transverse conduit 402 connects the suction conduits 244,444 downstream of the non-return valves 246,446. More specifically, the transverse conduit 402 connects the tank side of the hydraulic machines 210,212. The conduit 242 with the filtration unit 238 and the heat exchanger 240 is connected to the transverse conduit 402 between the suction conduits 244, 444. A first and a second means 404,406, in the form of non-return valves, are arranged on the transverse conduit 402 on either side of the connection for the conduit 242. The non-return valves 404,406 control the return flow from the hydraulic cylinders 104,105 to the tank 230 via the conduit 242; that is, via the filtration unit 238 and the heat exchanger 240. In other words, the second non-return valve 406 controls the return flow from the steering cylinders 104,105 to the tank via the conduit 242 when the first hydraulic machine 210 is pumping and the first non-return valve 404 controls the return flow from the steering cylinders 104,105 to the tank via the conduit 242 when the second hydraulic machine 212 is pumping.

Figure 5:
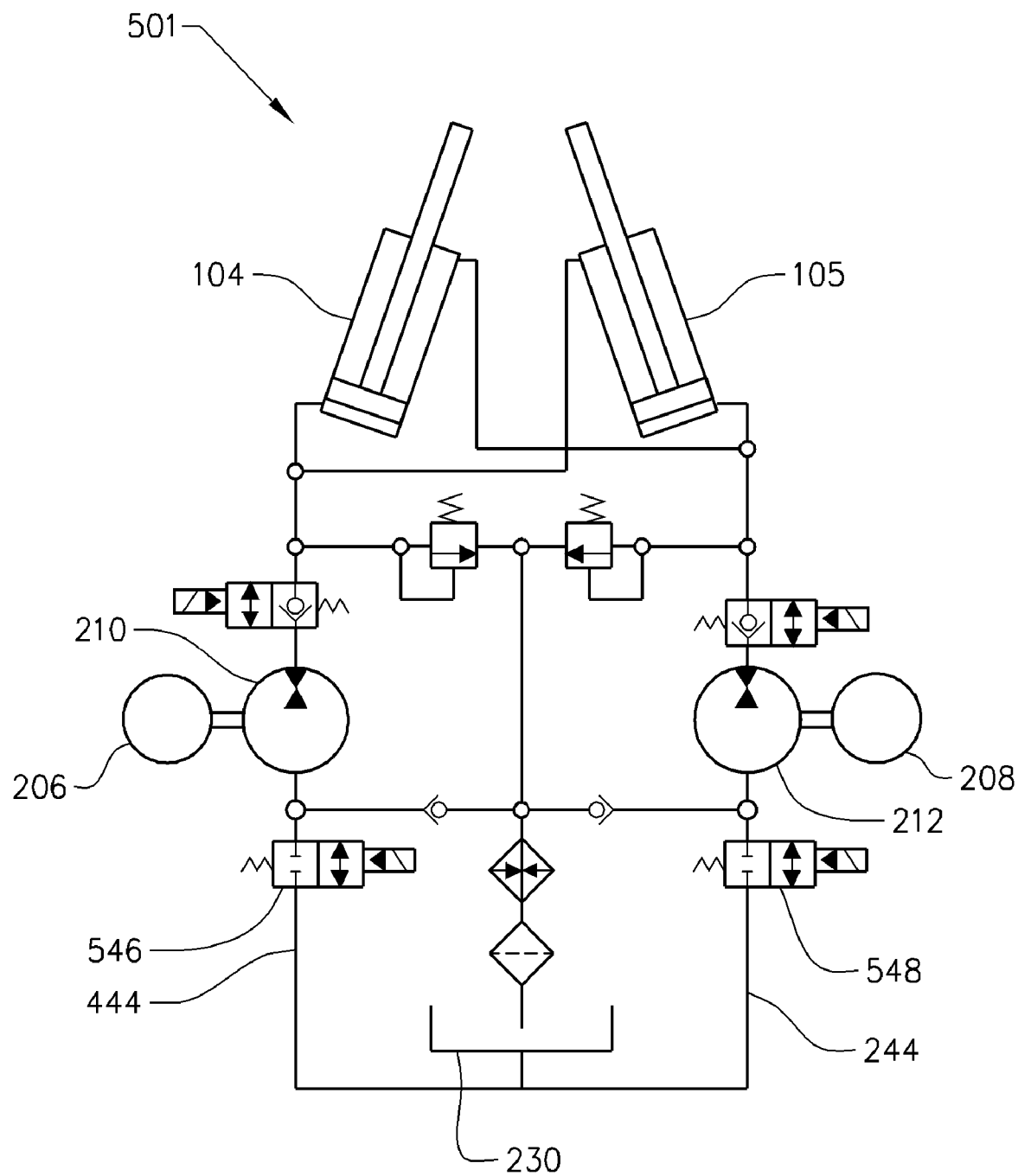

FIG. 5 shows a fourth embodiment of a control system 501 for frame-steering of the wheel loader 101. The fourth embodiment is a variant of the third embodiment with the only difference being that the non-return valves 246,446 on the suction conduits 244,444 have been replaced by electrically controlled valves 546,548. The electrically controlled valves 546,548 consist of on/off-valves. By this means, it is possible to reduce problems with cavitation on the suction side. As another alternative, a pilot-controlled non-return valve can be used, where a special pilot force (magnetic or pressure) holds the ball open. The respective valve 546,548 can be open when its associated hydraulic machine 210,212 rotates in such a direction that hydraulic fluid flows to the steering cylinder. The valves 546,548 are closed when the direction of rotation is reversed.

Figure 6:
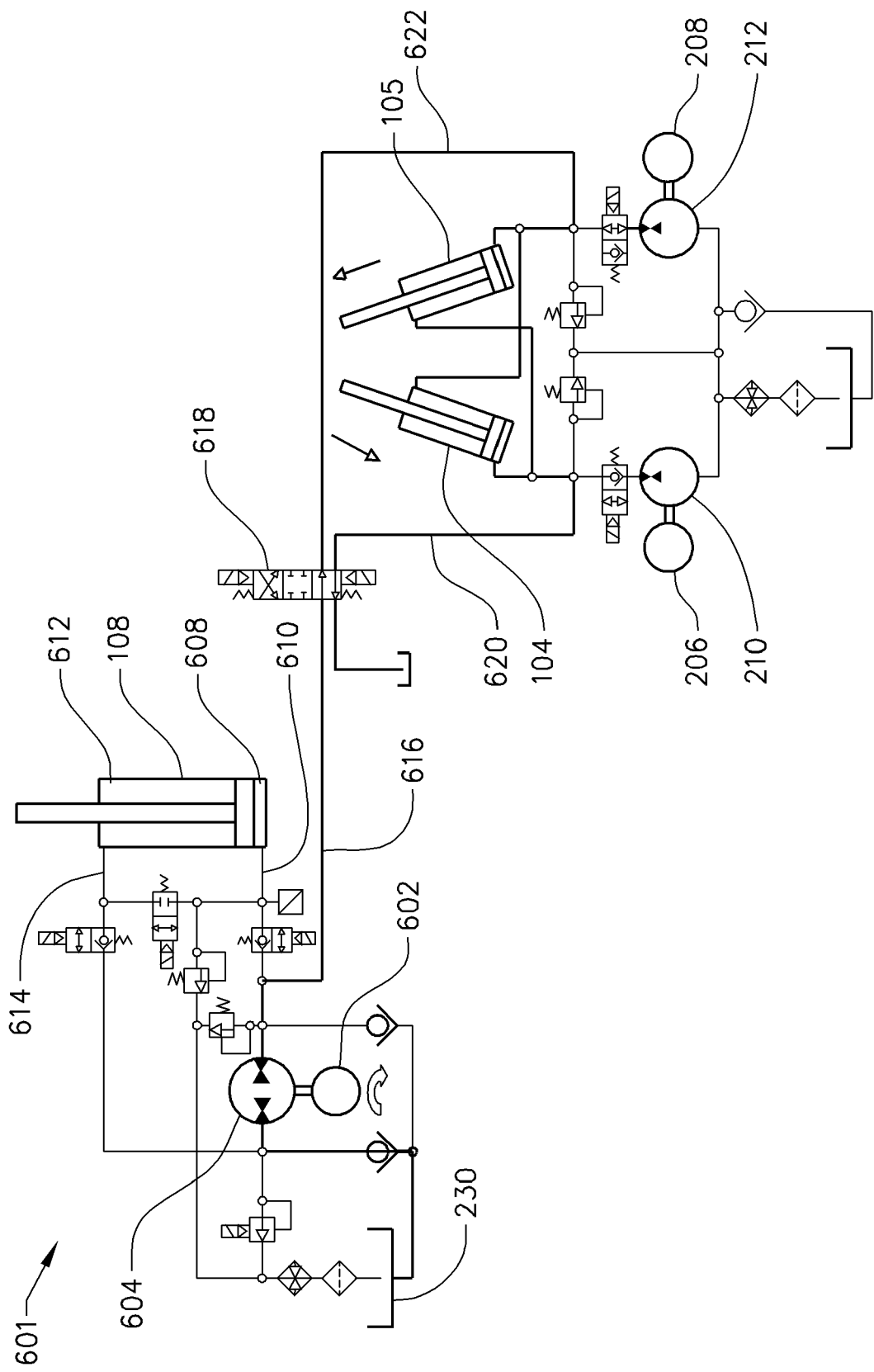

FIG. 6 shows a fifth embodiment of a control system 601 for frame-steering of the wheel loader 101. This embodiment is a further development of the first embodiment, that is shown in FIG. 2, in order to achieve a back-up control.

The control system 601 is arranged to control the movement in the vehicle's lifting cylinders 108,109 (only one of which is shown in FIG. 6). Alternatively or in addition, the control system could control the vehicle's tilt cylinder 110. The control system 601 comprises an electrical machine 602 and a hydraulic machine 604, wherein the electrical machine 602 is drivingly connected to the hydraulic machine 604.

The hydraulic machine 604 is connected to a piston side 608 of the hydraulic cylinder 108 via a first conduit 610 and a piston rod side 612 of the hydraulic cylinder 108 via a second conduit 614. In a first operating mode, the hydraulic machine 604 is arranged to be driven by the electrical machine 602 and to supply the hydraulic cylinder 108 with pressurized hydraulic fluid from the tank 230 and, in a second operating mode, it is driven by a hydraulic fluid flow from the hydraulic cylinder 108 and drives the electrical machine 602.

A bypass conduit 616 connects the hydraulic machine 604 for the lifting function to the steering cylinders 104,105. A means 618 for controlling the direction of the hydraulic fluid from the hydraulic machine 604 is arranged on the bypass conduit 616 and is connected to the steering cylinders 104, 105 via two different conduits 620,622. The control means 618 consists here of a directional valve. A first of the conduits 620 connects the hydraulic machine 604 for the lifting function to a piston side of the first steering cylinder 104 and a piston rod side of the second steering cylinder 105. A second of the conduits 622 connects the hydraulic machine 604 for the lifting function to the piston side of the second steering cylinder 105 and the piston rod side of the first steering cylinder 104.

Figure 7:
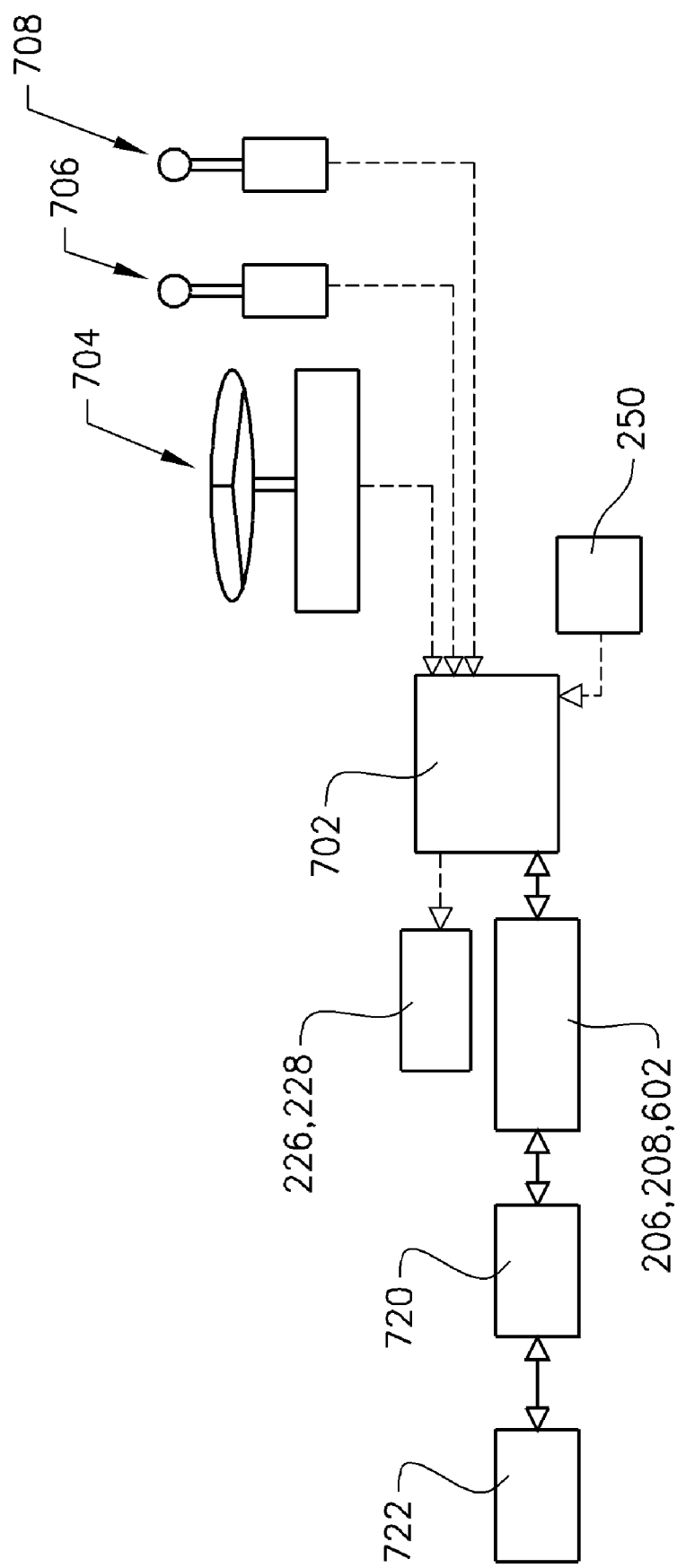
FIG. 7 shows a control device for controlling one or more of lifting, tilting and steering the wheel loader.

FIG. 7 shows a control device for controlling the control system 601 for the steering function and the lifting function shown in FIG. 6. A control unit 702 is electrically connected to the electrical machines 206,208,602 for controlling the speed of the pistons in the steering cylinders 104,105 by controlling the electrical machine(s). The electrical machines 206,208,602 are electrically connected to the control unit 702 in such a way that they are controlled by the control unit and in such a way that they can supply signals concerning the operating state to the control unit.

A plurality of elements, or controls, 704,706,708 are arranged in the cab 114 for hand operating by the driver and are electrically connected to the control unit 702 for controlling the different functions. A steering wheel 704 and a steering lever 706 are arranged for controlling the steering function. A lifting lever 708 is arranged for controlling the lifting function.

The control system comprises one or more energy-storage means 720 that are connected to one or more of said electrical machines 206,208,602. The energy-storage means 720 can, for example, consist of a battery or a super-capacitor. The energy-storage means 720 is arranged to provide the electrical machine with energy when the electrical machine is to function as a motor and drive its associated pump. The electrical machine is arranged to charge the energy-storage means 720 with energy when the electrical machine is driven by its associated pump and functions as a generator.

In addition, the wheel loader 101 comprises a power source 722 in the form of a combustion engine, that usually consists of a diesel engine, for propulsion of the vehicle. The diesel engine 722 is connected to the wheels of the vehicle and drives them via a drive line (not shown). In addition, the diesel engine 722 is connected to the energy-storage means 720 via a generator (not shown) for transmission of energy.

There can be alternative machines/units arranged for generating electrical power. According to a first alternative, a fuel cell is used that provides the electrical machine with energy. According to a second alternative, a gas turbine with an electrical generator is used to provide the electrical machine with energy.

In addition, FIG. 7 shows the additional components that are connected to the control unit 702 according to the first embodiment of the drive device for the lifting function, see FIG. 2, such as the electrically controlled valves 226,228, and the position detector 250. It will be recognized that corresponding components for the steering function are connected to the control unit 702.

The invention is not to be considered to be restricted to the embodiments that are described above, a number of additional variants and modifications being possible within the framework of the following patent claims.

What is claimed is:

1. A control system for a frame-steered vehicle, said system comprising:
   a first steering cylinder and a second steering cylinder, which steering cylinders are arranged for frame-steering of the vehicle; and
   a first drive unit and a second drive unit, each of which comprises an electrical machine and a hydraulic machine;
   wherein each of said electrical machines is drivingly connected to its associated hydraulic machine;
   wherein a first of the two hydraulic machines is arranged for flow communication with a piston side of the first steering cylinder and a piston rod side of the second steering cylinder and a second of the two hydraulic machines is arranged for flow communication with a piston side of the second steering cylinder and a piston rod side of the first steering cylinder; and
   wherein for steering the vehicle in one direction, a first of the hydraulic machines is arranged to be driven by its associated electrical machine and to supply the hydraulic cylinders with pressurized hydraulic fluid and the second hydraulic machine is arranged to be driven by a flow of hydraulic fluid from the hydraulic cylinders and to drive its associated electrical machine, and vice versa.

2. The control system as recited in claim 1, wherein the hydraulic machine that is driven by a flow of hydraulic fluid from the hydraulic cylinders is controlled in such a way that it provides a certain resistance so that energy from the flow of hydraulic fluid is regenerated to its associated electrical machine.

3. The control system as recited in claim 1, wherein each of the hydraulic machines is arranged to control the direction and speed of the hydraulic cylinders' pistons for steering the vehicle.

4. The control system as recited in claim 1, wherein the control system comprises a control unit that is electrically connected to the electrical machines for controlling the direction and speed of the hydraulic cylinders' pistons for steering the vehicle.

5. The control system as recited in claim 1, wherein the hydraulic machine of the first drive unit is connected to the hydraulic cylinders via a first conduit; the hydraulic machine of the second drive unit is connected to the hydraulic cylinders via a second conduit and a means is arranged on the first conduit and on the second conduit for controlling the direction of flow.

6. The control system as recited in claim 5, wherein said control means comprises an electrically-controlled valve.

7. The control system as recited in claim 1, wherein the two hydraulic machines are connected via a conduit in parallel with the steering cylinders.

8. The control system as recited in claim 7, further comprising a means arranged on the parallel conduit for achieving a leakage flow between the hydraulic machines upon the commencement of a steering movement.

9. The control system as recited in claim 8, wherein the leakage flow means consists of a controllable leakage-flow valve.

10. The control system as recited in claim 1, wherein a first means is arranged on a suction conduit that connects at least a second of the hydraulic machines to a tank to allow suction of hydraulic fluid from the tank and to prevent a flow of hydraulic fluid to the tank.

11. The control system as recited in claim 10, wherein a second means is arranged on a second suction conduit that connects the first hydraulic machine to the tank to allow suction of hydraulic fluid from the tank and to prevent a flow of hydraulic fluid to the tank.

12. The control system as recited in claim 11, wherein each of said first and second control means comprises a non-return valve.

13. The control system as recited in claim 11, wherein each of said first and second control means comprises a controllable directional valve.

14. The control system as recited in claim 1, wherein a transverse conduit connects the hydraulic machines on tank sides thereof.

15. The control system as recited in claim 1, wherein a filtration unit is arranged on an additional conduit that connects the steering cylinders to a tank.

16. The control system as recited in claim 15, wherein the conduit with the filtration unit connects a transverse conduit to the tank, the transverse conduit connecting the hydraulic machines on their tank sides.

17. The control system as recited in claim 16, wherein a control means is arranged on the transverse conduit on each side of the connection to the conduit with the filtration unit, with each of said control means allowing a flow of hydraulic fluid from the steering cylinders to the conduit and preventing a flow of hydraulic fluid in the other direction.

18. The control system as recited in claim 17, wherein each of said control means on the transverse conduit comprises a non-return valve.

19. A method for controlling a frame-steered vehicle by means of a first steering cylinder and a second steering cylinder, said method comprising:
   driving a first hydraulic machine to supply a piston side of the first steering cylinder and a piston rod side of the second steering cylinder with pressurized hydraulic fluid;
   allowing driving of a second hydraulic machine by a flow of hydraulic fluid from a piston side of the second steering cylinder and a piston rod side of the first steering cylinder;
   controlling a first electrical machine to drive the first hydraulic machine mechanically; and
   driving a second electrical machine mechanically by the second hydraulic machine, with energy being regenerated thereby.

20. The method as recited in claim 19, further comprising:
   carrying out a pressurizing via the hydraulic machines for refilling after a steering movement has been carried out.

21. The method as recited in claim 20, wherein the positioning of the steering cylinders is detected and utilized for registering that no unwanted deflection has arisen during the pressurizing.

22. The method as recited in claim 19, wherein the positioning of the steering cylinders is detected during and/or after steering and is utilized to indicate whether frame-steering is being carried out.

23. The control system as recited in claim 1, further comprising
   at least one additional hydraulic cylinder in addition to said first and second steering cylinders, and
   a further drive unit associated with said at least one additional hydraulic cylinder, said further drive unit comprising a further hydraulic machine and a further electrical machine that is drivingly connected to said further hydraulic machine,
   wherein said further hydraulic machine is hydraulically connected to a piston side of said at least one additional hydraulic cylinder via one conduit and is hydraulically connected to a piston rod side of said at least one additional hydraulic cylinder via another conduit, and
wherein the further hydraulic machine is arranged to be selectively hydraulically interconnected with said first and second steering cylinders.

24. The control system as recited in claim 23, wherein said at least one additional hydraulic cylinder is a lifting control cylinder.

25. The control system as recited in claim 23, wherein said at least one additional hydraulic cylinder is a tilt control cylinder.

26. The control system as recited in claim 23, wherein there are two additional hydraulic cylinders, one being a lifting control cylinder and the other being a tilt control cylinder.

* * * * *